UNITED STATES PATENT OFFICE 2,495,001

PROCESS FOR PRESERVING RICE

Toyoyori Hara, Chicago, Ill.

No Drawing. Application August 11, 1948,
Serial No. 43,759

7 Claims. (Cl. 99—186)

This invention relates generally to a food preserving process and more particularly to a process for preserving rice.

The present invention has among its objects the utilization of a preserving process by means of which the desirable characteristics of color, taste, appearance and freshness of the natural rice may be retained.

Another object of the invention is the utilization of such a process which will result in a rice product presenting excellent and uniform preservation qualities thereby minimizing spoiling. This quality is of particular importance with respect to the canning of rice or rice products which would appear to be readily spoilable, particularly by mold.

A further object of the invention is the utilization of such a process which is relatively simple, inexpensive, and in which standard equipment for material may be employed.

Many other objects and advantages of the present invention will be apparent to those skilled in the art from the disclosure herein given.

In employing the present invention, the rice to be preserved is first washed thoroughly to remove all foreign matter and excess starch, followed by straining to eliminate all imperfect rice, remove foreign matter, etc. that may have been associated with the rice. The rice is then soaked for a predetermined period of time in a solution comprising approximately 48 parts volume of water, one part salt, one part sugar, and a very small amount of white pepper. This solution is prepared by adding the dry ingredients to the water, boiling the same, and permitting it to cool. The rice is preferably placed in a jar, can or other container in which it is to be preserved, and the solution added thereto approximately equal amounts of rice and solution being employed following which one part of edible fat or oil as for example, vegetable oil, is then added to the rice and solution, the rice is permitted to soak at room temperatures in the solution and oil for a period of from four to eight hours, the container being unsealed during this period. It might be mentioned that too short a soaking period will result in insufficient penetration of the liquids into the rice grains and subsequent uneven cooking.

Following the soaking period, the container and rice, with the container still unsealed, is placed in a suitable pressure cooker, the liquid used for the pressure cooking being at room temperature or approximately 70° F. prior to the initiation of the cooking process. The pressure cooker is then gradually heated to bring the steam pressure up to between 4 and 10 pounds within 30 minutes to one hour after initially applying heat thereto, following which such pressure is maintained for a period from one to one and one-half hours.

At the end of such cooking period, the head is removed and the steam pressure in the pressure cooker is released following which, the container and rice is removed from the cooker and immediately sealed and permitted to cool.

It will be noted that in employing the above process, the rice is both soaked, and cooked under steam pressure, with the receptacle containing the rice unsealed, the sealing of the container taking place immediately following the removal thereof from the pressure cooker, contrary to the usual practice of cooking preserved products in hermetically sealed containers.

I have found that by employing the process above outlined, that the resulting preserved rice maintains its natural color and freshness without discoloration, as well as retention of the original shape of the rice grains, whereby the preserved rice upon use will have the appearance, color, freshness and taste of freshly prepared rice. Likewise, I have found that by employment of a suitable soaking period and gradual heating of the rice during the cooking process results in a uniformly cooked product without discoloration or undesirable change in shape of the rice grains, and following the cooking operation substantially all of the liquid or solution employed will be absorbed by the rice grains. The use of edible fat or oil as above disclosed is particularly effective in aiding the retention of shape, natural color, freshness and tastiness of the processed rice, and I found that the addition of a small amount of white pepper, while not affecting the taste of the processed rice, materially retards possible molding thereof.

I am aware that various processes of preserving rice have been employed, which have generally all employed cooking of the rice subsequent to the sealing of the container, and which have not employed an edible oil in conjunction therewith, and to which features of my invention I attribute the improved properties and qualities of rice prepared in accordance with the herein described process.

The edible oil would appear to facilitate the uniform cooking of the rice, assists in the prevention of discoloration and in the retention of shape by more or less sealing or retaining the moisture in the rice grains. While the amounts of salt and sugar may be varied to taste, three quarters to one and one-half parts of each providing adequate taste range. While the amount of edible oil may be varied within one-third to one and one-half parts, a great reduction will result in discoloration and hardness of the rice grain. Likewise, a greater amount will result in a product that is too oily or greasy.

Having thus described the invention, it will be apparent that various modifications may be made therein without departing from the spirit or scope of my invention.

What I claim as new and desire to secure by letters patent is:

1. The process of preserving rice comprising soaking the rice in a solution of water, salt and sugar, and edible oil for a predetermined period of time at a temperature of approximately 70° F. in an unsealed receptacle, gradually heating the unsealed receptacle containing the rice and solution, and cooking the same for a predetermined period of time under steam pressure, after which the pressure is released and the receptacle sealed.

2. A process of preserving rice comprising soaking the rice for a period from four to eight hours at a temperature of approximately 70° F., in a suitable solution to which one part of edible oil has been added, cooking said rice in solution for a period from one to one and one-half hours under steam pressure from four to ten pounds, following which the pressure is released and the rice sealed in an air tight receptacle.

3. A process of preserving rice comprising soaking the rice for a period from four to eight hours at a temperature of approximately 70° F., in a solution of approximately 48 parts water, one part salt, one part sugar and a small amount of white pepper, to which solution one part of edible oil has been added, cooking said rice and solution in an unsealed container for a period from one to one and one-half hours under steam pressure of from four to ten pounds, following which the pressure is released and the container sealed.

4. A process of preserving rice comprising soaking the rice for a period from four to eight hours at a temperature of approximately 70° F., in a solution of approximately 48 parts water, three-quarter to one and one-half parts salt, three-quarter to one and one-half parts sugar and a small amount of white pepper, to which solution one-third to one and one-half parts of edible oil has been added, cooking said rice and solution in an unsealed container for a period from one to one and one-half hours under steam pressure of from four to ten pounds, following which the pressure is released and the rice sealed in an air tight receptacle.

5. The process of preserving rice comprising soaking the rice in an unsealed receptacle containing a suitable solution, for a period from two to four hours at a temperature of approximately 70° F., gradually heating the unsealed receptacle containing the rice and solution, and cooking the same for a period of one to one and one-half hours under steam pressure of from four to ten pounds, after which the pressure is released and the receptacle sealed.

6. A process of preserving rice comprising soaking the rice in a solution of salt, sugar, and edible oil for a pre-determined period of time, and cooking the rice and solution for a pre-determined period of time under steam pressure, after which the pressure is released and the rice sealed in an air-tight receptacle.

7. A process of preserving rice comprising soaking the rice for a pre-determined period of time in a solution of approximately forty-eight parts water, one part salt, and one part sugar, to which solution one part of edible oil has been added, heating the rice or solution in an unsealed receptacle and cooking the same for a period of from one to one and one-half hours under steam pressure of from four to ten pounds, following which the pressure is released and the receptacle sealed.

TOYOYORI HARA.

REFERENCES CITED

The following references are of record in the file of this patent:

UNITED STATES PATENTS

| Number | Name | Date |
| --- | --- | --- |
| 2,187,718 | Wilbur | Jan. 23, 1940 |
| 2,334,666 | Malek | Nov. 16, 1943 |